US008884938B2

(12) United States Patent
Hsu et al.

(10) Patent No.: US 8,884,938 B2
(45) Date of Patent: Nov. 11, 2014

(54) DATA DRIVING APPARATUS AND OPERATION METHOD THEREOF AND DISPLAY USING THE SAME

(71) Applicant: AU Optronics Corp., Hsin-Chu (TW)

(72) Inventors: Chih-Che Hsu, Hsin-Chu (TW); Chun-Fu Liu, Hsin-Chu (TW); Shung-Ting Tsai, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 148 days.

(21) Appl. No.: 13/664,645

(22) Filed: Oct. 31, 2012

(65) Prior Publication Data

US 2013/0147782 A1 Jun. 13, 2013

(30) Foreign Application Priority Data

Dec. 9, 2011 (TW) ................................ 100145681

(51) Int. Cl.
*G06F 3/038* (2013.01)

(52) U.S. Cl.
USPC .......................................................... 345/204

(58) Field of Classification Search
CPC ............................ G09G 3/20; H04N 13/0497
USPC ............... 345/82, 98, 99, 100, 204, 211, 212; 326/30, 86
See application file for complete search history.

(56) References Cited

U.S. PATENT DOCUMENTS

| | | | | |
|---|---|---|---|---|
| 6,657,622 | B2 * | 12/2003 | Park | 345/205 |
| 7,868,865 | B2 * | 1/2011 | Shin et al. | 345/92 |
| 2008/0129652 | A1 * | 6/2008 | Park | 345/55 |
| 2010/0156885 | A1 | 6/2010 | Cho et al. | |
| 2010/0302214 | A1 * | 12/2010 | Kim et al. | 345/204 |
| 2012/0154454 | A1 * | 6/2012 | Ohishi | 345/690 |

FOREIGN PATENT DOCUMENTS

| | | |
|---|---|---|
| CN | 101763831 A | 6/2010 |
| TW | 200844942 | 11/2008 |

OTHER PUBLICATIONS

China Patent Office, "Office Action", Nov. 5, 2013.

* cited by examiner

*Primary Examiner* — Pegeman Karimi
(74) *Attorney, Agent, or Firm* — WPAT, PC; Justin King

(57) ABSTRACT

A data driving apparatus includes two data driving circuits, each including a timing controller with a clock generator and configured to receive a specific portion of data corresponding to a row of pixel in an image frame, and, after receiving the specific portion of the data, process the portion of the data; wherein the two timing controllers have different data operation times. One timing controller outputs an enable command to another one once the processing of the respective portion of the data is complete. Then, another timing controller starts to process the respective portion of the data and output an output command to the first data driving circuit in response to a finish of the processing of the second portion of the data and thereby controlling the two data driving circuits to output the processed data. An operation method thereof and a display using the same are also provided.

20 Claims, 9 Drawing Sheets

DATA DRIVING APPARATUS AND OPERATION METHOD THEREOF AND DISPLAY USING THE SAME

TECHNICAL FIELD

The present disclosure relates to a display technology field, and more particularly to a data driving apparatus, an operation method thereof and a display using the same.

BACKGROUND

Conventionally, the data driving apparatus used in a large-scaled display is realized by at least two data driving circuits coupled in parallel; and, to have the benefits of one single integration chip, these data driving circuits as well as their associated timing controllers are integrated into one single chip.

However, when these data driving apparatuses receive and process the data of a to-be-displayed image frame according to a specific transmission protocol (e.g., transmission protocol of the Mobile Industry Processor Interface, MIPI) for saving power by stopping the transmission of data, the at least two timing controllers may operate according to the clocks generated by the respective clock generators. Because these individual clock generators may not generate clocks with the same frequency, the data driving circuits in the conventional data driving apparatus may not be able to output data synchronously.

SUMMARY

Therefore, the disclosure provides a data driving apparatus, and the timing controllers therein can operate at respective individual clocks and the data driving circuits therein can output data synchronously.

The disclosure further provides a display employing the aforementioned data driving apparatus.

The disclosure still further provides an operation method of the aforementioned data driving apparatus.

An embodiment of the disclosure provides a data driving apparatus, which includes a first data driving circuit and a second data driving circuit. The first data driving circuit includes a first timing controller and the first timing controller includes a first clock generator. The first data driving circuit is configured to receive a first portion of data corresponding to a row of pixel in an image frame. The second data driving circuit includes a second timing controller and the second timing controller includes a second clock generator. The second data driving circuit is configured to receive a second portion of the data corresponding to the row of pixel in the image frame. The first timing controller is further configured to, after receiving the first portion of the data, process the first portion of the data according to a first clock generated by the first clock generator and outputs an enable command to the second timing controller in response to a finish of the processing of the first portion of the data, and the second timing controller is configured to start, in response to the enable command, to process the second portion of the data according to a second clock generated by the second clock generator and output an output command to the first data driving circuit, in response to a finish of the processing of the second portion of the data, and thereby controlling the first and second data driving circuits to output a processed first and a second processed portions of the data, respectively.

Another embodiment of the disclosure provides a display, which includes the aforementioned data driving apparatus, a display panel, a plurality of data lines, a scan driving apparatus and a plurality of scan lines. The data driving apparatus is configured to output the processed first and second portions of the data. The display panel includes a plurality of pixels. The data lines, electrically connected to columns of the pixel respectively and the data driving apparatus, is configured to transmit the processed first and second portions of the data to the associated pixels. The scan driving apparatus is configured to provide a scan signal. The scan lines, electrically connected to rows of the pixel respectively and the scan driving apparatus, is configured to transmit the scan signal to the associated pixels.

Still another embodiment of the disclosure provides a data driving apparatus, which includes a first data driving circuit, a second data driving circuit and a transmission bus. The first data driving circuit includes a first timing controller and the first timing controller includes a first clock generator. The first data driving circuit is configured to receive and process a first portion of data corresponding to a row of pixel in an image frame. The second data driving circuit includes a second timing controller and the second timing controller includes a second clock generator. The second data driving circuit is configured to receive and process a second portion of the data corresponding to the row of pixel in the image frame. The transmission bus is electrically connected between the first and second data driving circuits and includes a transmission control line, a clock transmission line, a data transmission line and an enable command transmission line. The transmission control line is configured to control a transmission direction or data type of signals on the transmission bus. The clock transmission line is configured to, according to the voltage level on the transmission control line, selectively transmit a clock generated by the first data driving circuit or a clock generated by the second data driving circuit. The data transmission line is configured to, according to the voltage level on the transmission control line, selectively transmit first data generated by the first data driving circuit or second data generated by the second data driving circuit. The enable command transmission line is configured to transmit and output command for controlling the first and second data driving circuits to output the processed first and second portions of the data, respectively.

Yet another embodiment of the disclosure provides an operation method of a data driving apparatus. The data driving apparatus, which includes a first data driving circuit and a second data driving circuit. The first data driving circuit includes a first timing controller and the first timing controller includes a first clock generator. The first data driving circuit is configured to receive a first portion of data corresponding to a row of pixel in an image frame. The second data driving circuit includes a second timing controller and the second timing controller includes a second clock generator. The second data driving circuit is configured to receive a second portion of the data corresponding to the row of pixel in the image frame. The operation method includes: controlling the first timing controller, after receiving the first portion of the data, to process the first portion of the data according to a first clock generated by the first clock generator and output an enable command to the second timing controller once the processing of the first portion of the data is complete, and thereby controlling the second timing controller to start, in response to the enable command, to process the second portion of the data according to a second clock generated by the second clock generator; and controlling the second timing controller to output, once the processing of the second portion of the data is complete, an output command to the first data driving circuit and thereby controlling the first and second data driving circuits to output the processed first and second portions of the data, respectively.

In summary, the data driving apparatus according to the present disclosure is configured to sequentially perform: controlling the first timing controller, after receiving the first portion of the data, to process the first portion of the data according to a first clock generated by the first clock generator; controlling the first timing controller to output an enable command to the second timing controller once the processing of the first portion of the data is complete; controlling the second timing controller to start, in response to the enable command, to process the second portion of the data according to a second clock generated by the second clock generator; and controlling the second timing controller to output, once the processing of the second portion of the data is complete, an output command to the first data driving circuit and thereby controlling the first and second data driving circuits to output the processed first and second portions of the data, respectively. Thus, the timing controllers of the data driving apparatus according to the present disclosure are able to output data synchronously while operating at respective individual clocks.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The First Embodiment

Figure 1:
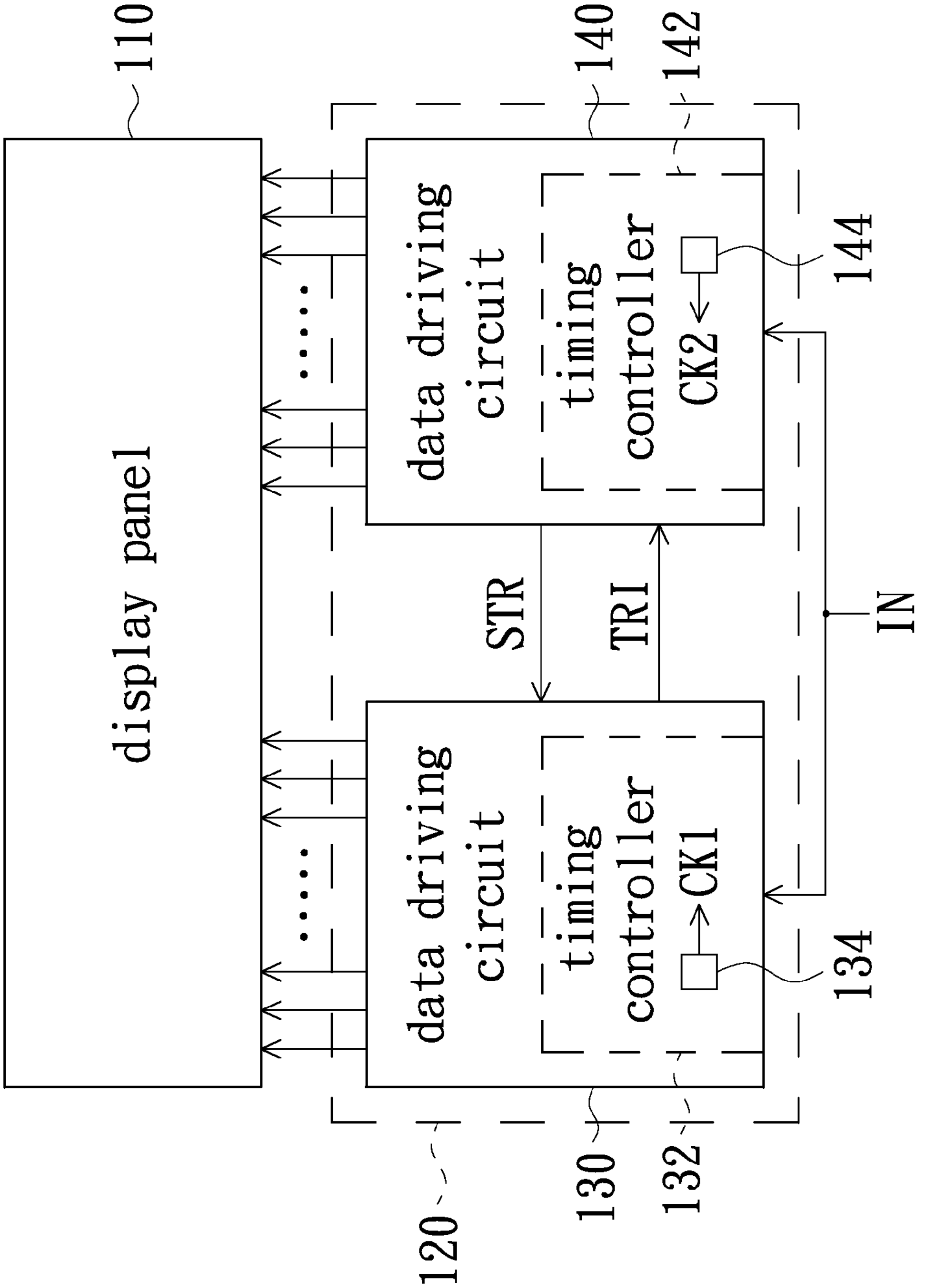
FIG. 1 is a schematic view of a data driving apparatus in accordance with a first embodiment of the present disclosure.

FIG. 1 is a schematic view of a data driving apparatus in accordance with a first embodiment of the present disclosure. As shown, the data driving apparatus 120 in this embodiment is electrically connected to a display panel 110 and comprises two data driving circuits 130, 140. The data driving circuit 130 includes a timing controller 132, and the timing controller 132 includes a clock generator 134. The data driving circuit 140 includes a timing controller 142, and the timing controller 142 includes a clock generator 144. The timing controllers 132, 142 each are configured to, according to some specific transmission protocols (e.g., transmission protocol of the Mobile Industry Processor Interface, MIPI) for saving power by stopping the transmission of data, to receive and process data IN of a to-be-displayed image frame; specifically, the timing controller 132 receives and processes a first portion of the data corresponding to a row of pixel in the to-be-displayed image frame, and the timing controller 142 receives and processes a second portion of the data corresponding to the row of pixel in the to-be-displayed image frame.

In this embodiment, the timing controller 132, after receiving the first portion of data, starts to process the first portion of the data according to a clock CK1 generated by the clock generator 134, and outputs an enable command TRI to the timing controller 142 once the processing of the first portion of the data is complete. Then, the timing controller 142 starts to, in response to the enable command TRI, process the second portion of the data according to a clock CK2 generated by the clock generator 144. Afterwards, the timing controller 142, once the processing of the second portion of the data is complete, outputs an output command STR to the data driving circuit 130 and thereby controlling the data driving circuits 130, 140 to output (may simultaneously) the processed first and second portions of the data, respectively. In this embodiment, the processing of data is associated with the reading, correcting, analyzing and/or converting of the data.

Therefore, the timing controller 132, 142 of the data driving apparatus 120 according to the present disclosure are able to output data synchronously while operating at two respective individual clocks.

Figure 2:
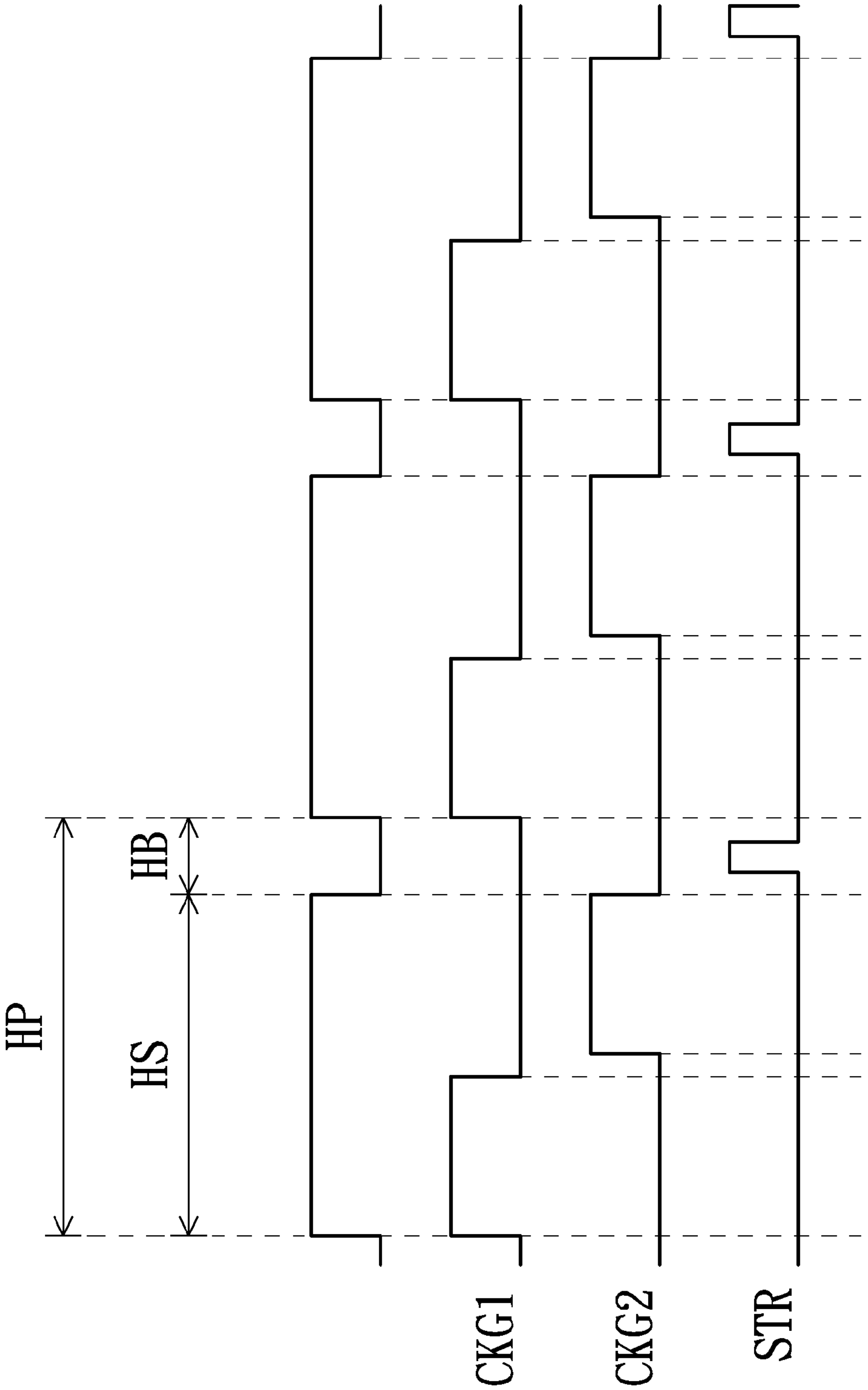
FIG. 2 is a time sequence of two clocks CKG1, CKG2 and the output command STR associated with the data driving apparatus depicted in FIG. 1.

FIG. 2 is a time sequence of two clocks CKG1, CKG2 and the output command STR associated with the data driving apparatus 120 depicted in FIG. 1. As shown, the horizontal scanning period (also referred to as the data processing duration of each scan line or the data processing duration of each row of pixel) is indicated with HP; specifically, each horizontal scanning period HP is defined with a horizontal scanning duration HS and a horizontal blanking duration HB. In addition, the enable time of each one of the pulses of the clock CKG1 indicates the time for the generation of the clock CK1 by the clock generator 134; in other words, the timing controller 132 is configured to complete, according to the clock CK1, the processing of the first portion of data in one enable pulse of the clock CKG1. As mentioned above, the timing controller 132 then outputs the enable command TRI to the timing controller 142 once the processing of the first portion of data is complete; and consequently, the timing controller 142 starts to, in response to the enable command TRI, process the second portion of data according to the clock CK2. Likewise, the generation of the clock CK2 from the clock generator 144 is corresponding to each enable pulse of the clock CKG2; in other words, the timing controller 142 is configured to complete, according to the clock CK2, the processing of the second portion of data in one enable pulse of the clock CKG2. Afterwards, the timing controller 142, once the processing of the second portion of data is complete, outputs the output command STR to the data driving circuit 130 and thereby controlling the data driving circuits 130, 140 to output the processed first and second portions of data, respectively.

In addition, the timing controller 132 may be further configured to provide an index parameter to the timing controller 142 simultaneously with issuing the enable command TRI to the timing controller 142; wherein the index parameter herein is used for indicating the total number of the pixels corresponding to the first portion of data. Therefore, the timing controller 142 can ensure the received second portion of data is processed in a specific according to the index parameter. In addition, the timing controllers 132, 134 are further configured to, if both having a color engine function, perform the color engine function on the first and second portions of data according to the clocks CK1, CK2, respectively; wherein the color engine function herein includes, for example, an image sharpness adjustment, a dynamic contrast ratio and a backlight control.

The Second Embodiment

Figure 3:
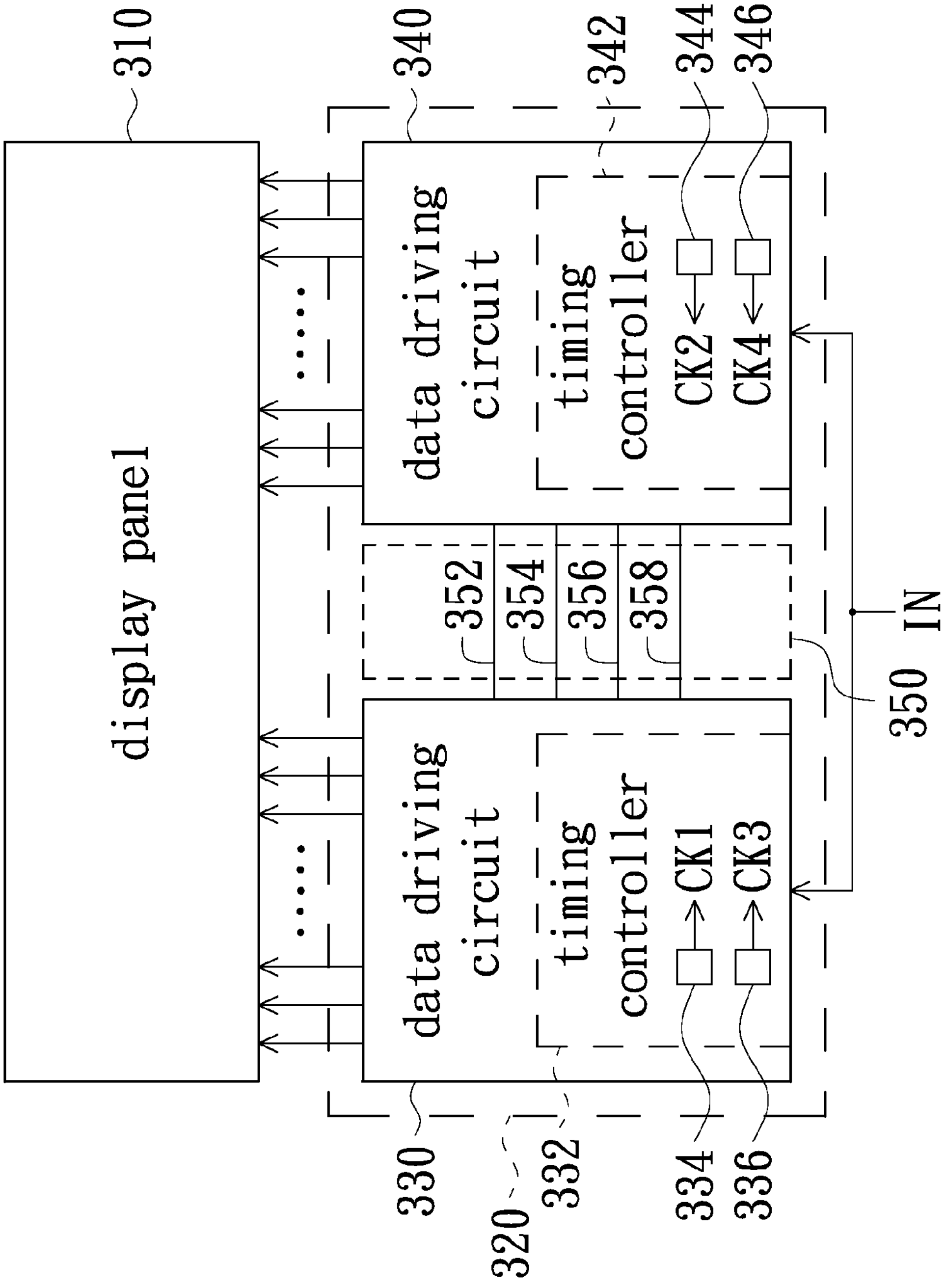
FIG. 3 is a schematic view of a data driving apparatus in accordance with another embodiment of the present disclosure.

FIG. 3 is a schematic view of a data driving apparatus in accordance with a second embodiment of the present disclosure. As shown, the data driving apparatus 320 in this embodiment has a circuit structure similar to the data driving apparatus 120 in the first embodiment has; and the main difference between the two is that the data driving apparatus 320 in this embodiment further includes a transmission bus, which is configured to transmit the enable command TRI, the output command STR and the index parameter.

As depicted in FIG. 3, the data driving apparatus 320 is electrically connected to a display panel 310 and comprises two data driving circuits 330, 340 and a transmission bus 350. The data driving circuit 330 comprises a timing controller 332, and the timing controller 332 comprises a clock generators 334. The timing controller 332 may further comprise a clock generator 336. The clock generators 334, 336 are configured to generate clocks CK1, CK3, respectively. Likewise, the data driving circuit 340 includes a timing controller 342, and the timing controller 342 includes a clock generator 344. The timing controller 332 may further comprise a clock generator 346. The clock generators 334, 336 are configured to generate clocks CK2, CK4, respectively. The transmission bus 350 is electrically connected between the two data driving circuits 330, 340 and configured to transmit the enable command TRI, the output command STR and the index parameter. Moreover, the clock CK3 may be generated according the clock CK1, and the clock CK4 may be generated according the clock CK2. Specifically, the clock CK3 may be generated by dividing the clock CK1, and the clock CK4 may be generated by dividing the clock CK2. Accordingly, the clock generator 336 and the clock generator 346 may respectively comprise a clock divider to divide corresponding clock.

In this embodiment, the transmission bus 350 includes a transmission control line 352, a clock transmission line 354, a data transmission line 356 and an enable command transmission line 358. Specifically, the transmission control line 352 is configured to control the transmission direction or data type of signals on the transmission bus 350 or the type of the data transmitted by the transmission bus 350. The clock transmission line 354 is configured to selectively transmit the clocks CK1, CK2, CK3 or CK4 according to the voltage level on the transmission control line 352; wherein basically, the clocks CK1, CK2 each are configured to have a frequency greater than the clocks CK3, CK4 have. In this embodiment, the clocks CK3, CK4 are referred to as a reference clock while the timing controllers 332, 342 perform data transmissions, respectively; and the clocks CK1, CK2 are referred to as a reference clock while the timing controllers 332, 342 perform computations, respectively. It is understood that the timing controllers 332, 342 can corporately use either the clock CK1 or the clock CK2 only as the reference clock while performing data transmissions. The data transmission line 356 is configured to, according to the voltage level on the transmission control line 352, selectively transmit either the first data generated by the timing controller 332 or the second data generated by the timing controller 342; wherein the enable command TRI and the index parameter are included in the first data. In addition, the enable command transmission line 358 is configured to transmit the output command STR.

Figure 4:
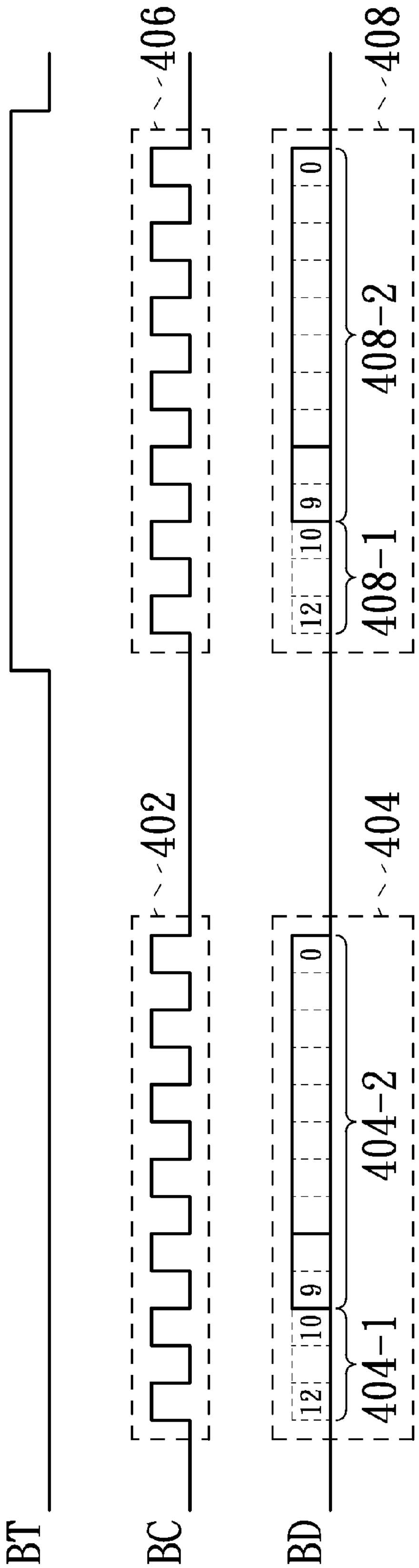
FIG. 4 is an exemplified time sequence of signals associated with an operation of the transmission bus depicted in FIG. 3.

FIG. 4 is an exemplified time sequence of signals associated with an operation of the transmission bus 350. As shown, the voltage level on the transmission control line 352 is indicated with BT; the signal on the clock transmission line 354 is indicated with BC; and the signal on the data transmission line 356 is indicated with BD. The voltage level on the transmission control line 352 is controlled by the timing controller 342. Specifically, as illustrated in FIGS. 3, 4, the timing controller 332 is permitted to transmit data to the timing controller 342 through the transmission bus 350 while the transmission control line 352 has a logic-low level; alternatively, the timing controller 342 is permitted to transmit data to the timing controller 332 through the transmission bus 350 while the transmission control line 352 has a logic-high level. The clock transmission line 354 is controlled by the voltage level on the transmission control line 352. Specifically, the clock transmission line 354 is used to transmit the clock CK3 (also indicated with 402 in FIG. 4) generated by the timing controller 332 while the transmission control line 352 has a logic-low level; alternatively, the clock transmission line 354 is used to transmit the clock CK4 (also indicated with 406 in FIG. 4) generated by the timing controller 342 while the transmission control line 352 has a logic-high level.

The data transmission line 356 is controlled by the voltage level on the transmission control line 352. Specifically, the data transmission line 356 is used to transmit the first data (indicated with 404 in FIG. 4) generated by the timing controller 332 while the transmission control line 352 has a logic-low level; alternatively, the data transmission line 356 is used to transmit the second data (indicated with 408 in FIG. 4) generated by the timing controller 342 while the transmission control line 352 has a logic-high level. In this embodiment, the first and second data may both have a packet format; accordingly, the enable command TRI is included in the packet associated with the first data for transmission, or, both the enable command TRI and the index parameter are included in the packet associated with the first data for transmission. As illustrated in FIG. 4, the packet of the first data 404 includes an identifiable header 404-1 and ontology-based data 404-2; likewise, the packet of the second data 408 includes an identifiable header 408-1 and ontology-based data 408-2. In other words, the data format of the data transmitted on the data transmission line 356 is constituted by an identifiable header and ontology-based data.

Figure 5:
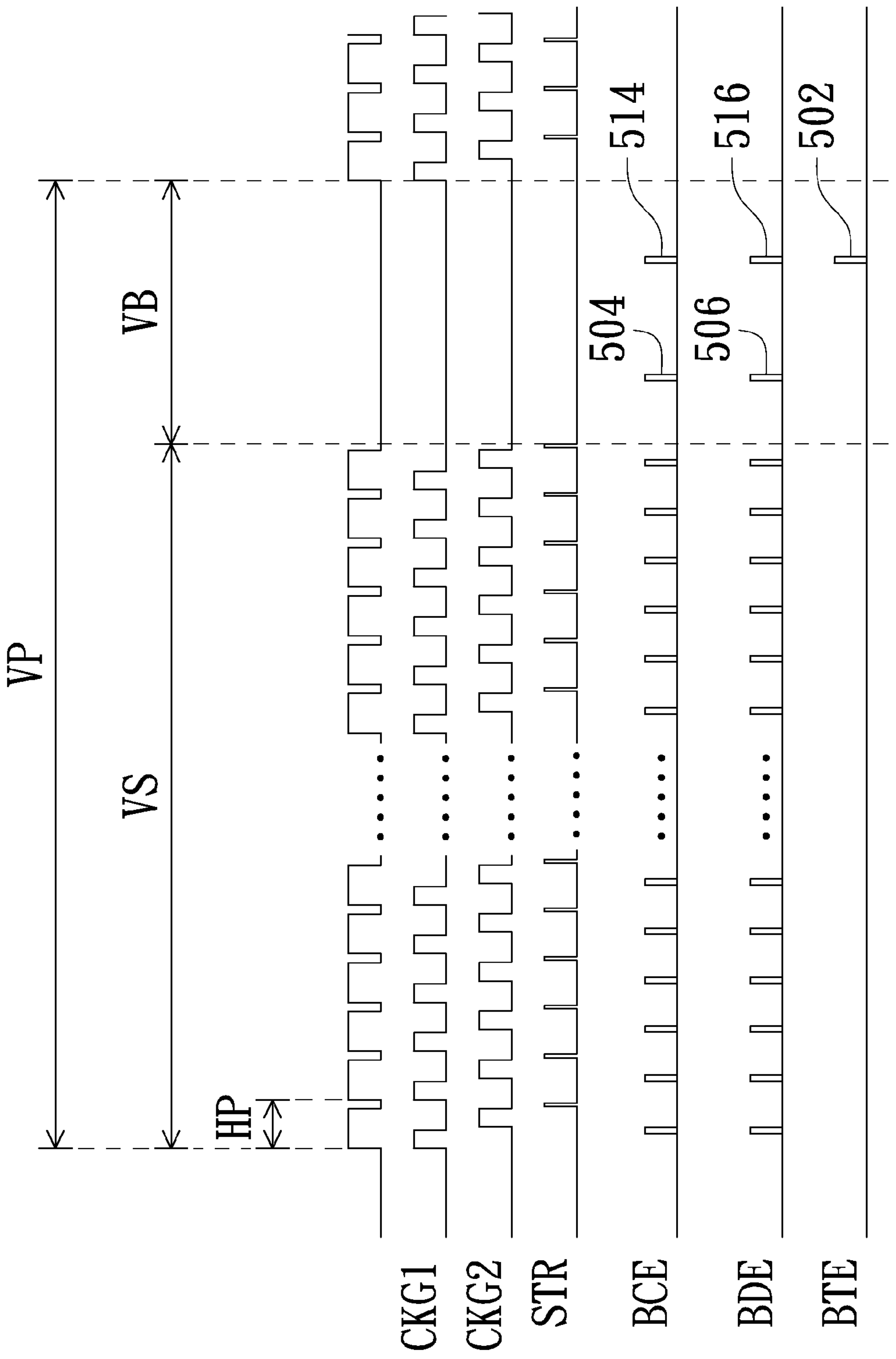
FIG. 5 is a schematic view illustrating that the two data driving circuits depicted in FIG. 3 corporately perform a data exchange operation.

In addition, the data driving circuits 330, 340 in the data driving apparatus 320 may be further configured to corporately perform a data exchange operation. FIG. 5 is a schematic view illustrating that the data driving circuits 330, 340 corporately perform a data exchange operation. As shown, the vertical scanning period of each image frame is indicated with VP. Specifically, each vertical scanning period VP is defined with a vertical scanning duration VS and a vertical blanking duration VB; and each vertical scanning duration VS includes a plurality of horizontal scanning periods HP. In addition, the enable time of each one of the pulses of the clock CKG1 indicates the time for the generation of the clock CK1 by the clock generator 334; in other words, the timing controller 332 is configured to complete, according to the clock CK1, the processing of the first portion of data in one enable pulse of the clock CKG1. Then, the timing controller 332 outputs the enable command TRI, or also the index parameter, to the timing controller 342 once the processing of the first portion of data is complete; and consequently, the timing controller 342 starts to, in response to the enable command TRI, process the second portion of data according to the clock CK2.

Likewise, the generation of the clock CK2 from the clock generator 344 is corresponding to each enable pulse of the clock CKG2; in other words, the timing controller 342 is configured to complete, according to the clock CK2, the processing of the second portion of data in one enable pulse of the clock CKG2. Afterwards, the timing controller 342, once the processing of the second portion of data is complete, outputs the output command STR to the data driving circuit 330 and thereby controlling the data driving circuits 330, 340 to output the processed first and second portions of data, respectively. In addition, the time sequence of the signal on the clock transmission line 354 is indicated with BCE; the time sequence of the signal on the data transmission line 356 is indicated with BDE; and the time sequence of the voltage levels on the transmission control line 352 is indicated with BTE. Specifically, each enable pulse of the time sequence BCE is referred to as a clock transmission time; and each enable pulse of the time sequence BDE is referred to as a data transmission time.

As illustrated in FIG. 5, the voltage level on the transmission control line 352 has no change (specifically, maintained at logic-low) within the vertical scanning duration VS. Thus, the clock transmission line 354 is used to transmit the clock CK3 generated by the timing controller 332 to the timing controller 342; and the data transmission line 356 is used to transmit the first data generated by the timing controller 332 to the timing controller 342. The timing controller 332 can, within the vertical blanking duration VB and before the voltage level on the transmission control line 352 having a change at time point 502, transmit the clock CK3 (also indicated with 504 in FIG. 5) and the first data (indicated with 506 in FIG. 5) to the timing controller 342 through the clock transmission line 354 and the clock transmission line 356, respectively. Therefore, the data exchanging request or the data required by the timing controller 342 can be transmitted to the timing controller 342 through the pocket of the first data 506.

When the voltage level on the transmission control line 352 has a change at time point 502, the clock transmission line 354 is used to transmit the clock CK4 (indicated with 514 in FIG. 5) generated by the timing controller 342 to the timing controller 332; and the clock transmission line 356 is used to transmit the second data (indicated with 516 in FIG. 5) generated by the timing controller 342 to the timing controller 332. Therefore, the data required by the timing controller 332 can be transmitted to the timing controller 332 through the pocket of the second data 516. Thus, the timing controllers 332, 342 can perform the data exchange operation via the first and second data transmitted therebetween within the vertical blanking duration VB.

The Third Embodiment

Figure 6:
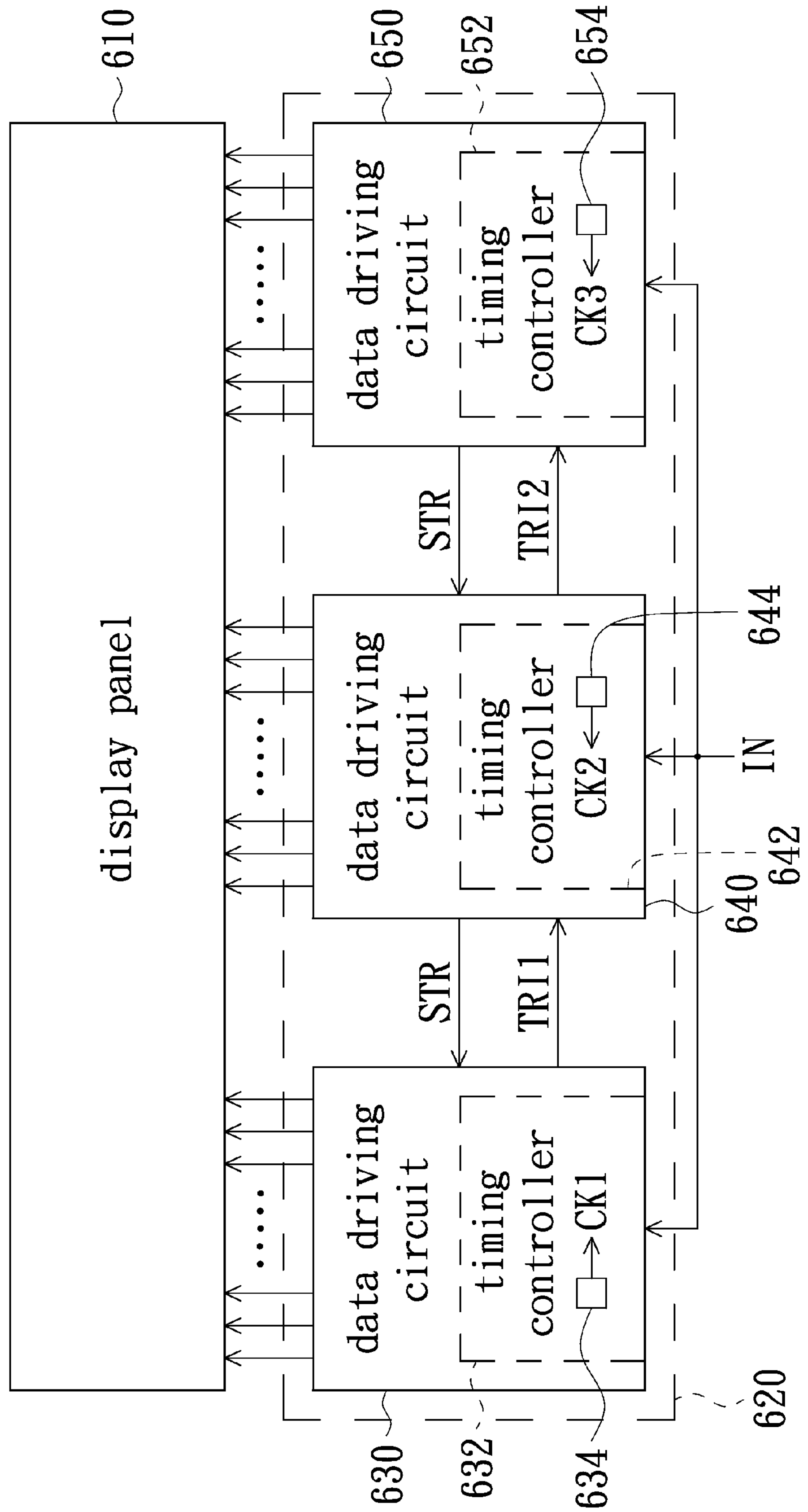
FIG. 6 is a schematic view of a data driving apparatus in accordance with another embodiment of the present disclosure.

FIG. 6 is a schematic view of a data driving apparatus in accordance with a third embodiment of the present disclosure. As shown, the data driving apparatus 620 in this embodiment is electrically connected to a display panel 610 and includes three data driving circuits 630, 640 and 650. The data driving circuit 630 includes a timing controller 632, and the timing controller 632 includes a clock generator 634 configured to generate the clock CK1. The data driving circuit 640 includes a timing controller 642, and the timing controller 642 includes a clock generator 644 configured to generate the clock CK2. The data driving circuit 650 includes a timing controller 652, and the timing controller 652 includes a clock generator 654 configured to generate the clock CK3. In addition, the timing controller 632 is configured to receive a first portion of the data corresponding to a row of pixel in an image frame; the timing controller 642 is configured to receive a second portion of the data corresponding to the row of pixel in the image frame; and the timing controller 652 is configured to receive a third portion of the data corresponding to the row of pixel in the image frame.

In this embodiment, the timing controller 632, after receiving the first portion of data, starts to process the first portion of the data according to the clock CK1 generated by the clock generator 634, and outputs a first enable command TRH to the timing controller 642 once the processing of the first portion of data is complete. Then, the timing controller 642 starts to, in response to the first enable command TRI1, process the second portion of the data according to the clock CK2 generated by the clock generator 644, and outputs a second enable command TRI2 to the timing controller 652 once the processing of the second portion of data is complete. Then, the timing controller 652 starts to, in response to the second enable command TRI2, process the third portion of the data according to the clock CK3 generated by the clock generator 654. Afterwards, the timing controller 652, once the processing of the third portion of the data is complete, outputs an output command STR to the data driving circuits 630, 640 and thereby controlling the data driving circuits 630, 640 and 650 to output (simultaneously) the processed first, second and third portions of the data, respectively. In this embodiment, the output command STR issued from the timing controller 652 is first delivered to the timing controller 642, and then delivered to the timing controller 632 from the timing controller 642.

Figure 7:
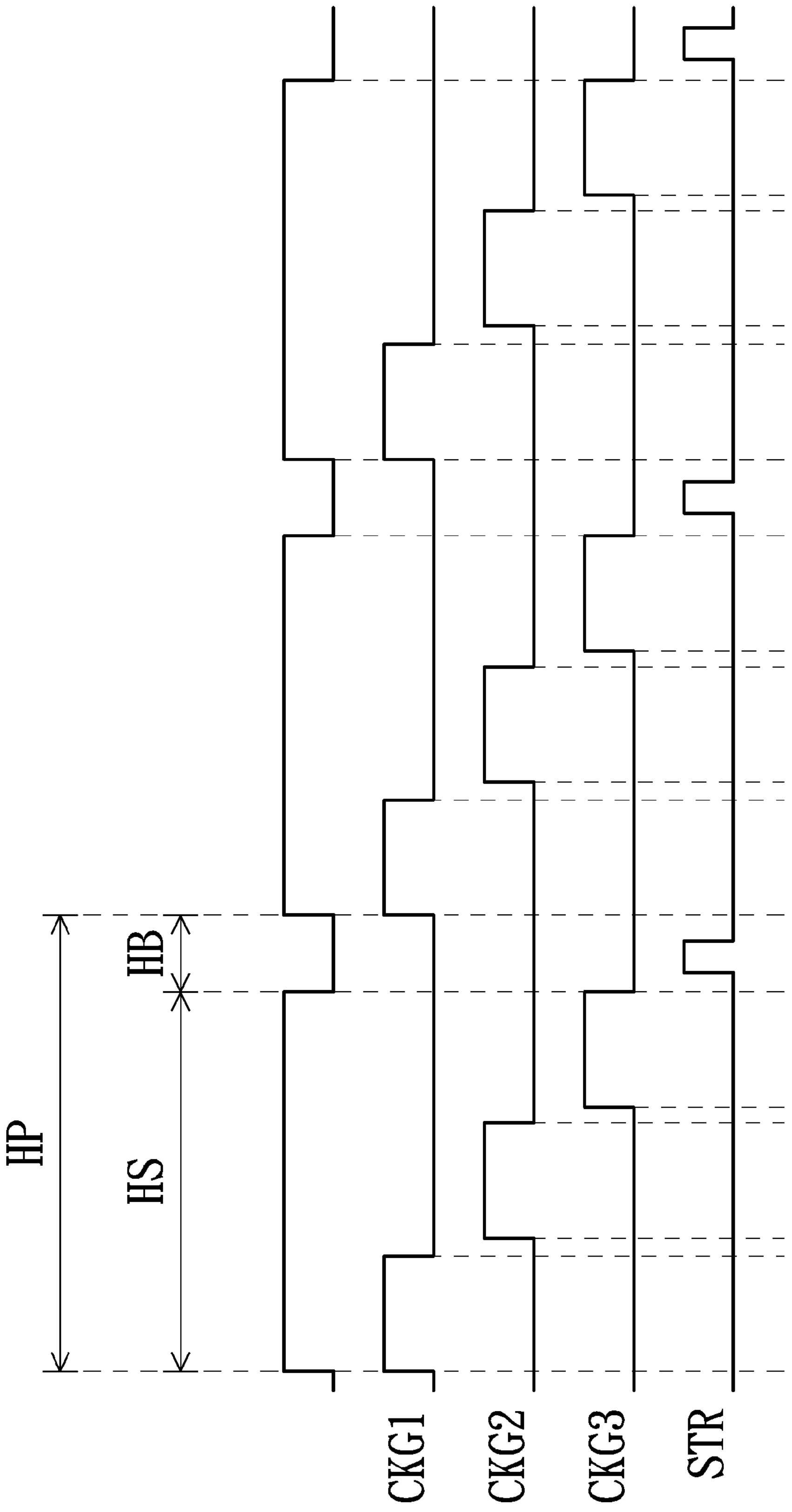
FIG. 7 is a time sequence of three clocks CKG1, CKG2, CKG3 and the output command STR associated with the data driving apparatus depicted in FIG. 6.

FIG. 7 is a time sequence of three clocks CKG1, CKG2, CKG3 and the output command STR associated with the data driving apparatus 620 depicted in FIG. 6. As shown, the horizontal scanning period (also referred to as the data processing duration of each row of pixel) is indicated with HP; specifically, each horizontal scanning period HP is defined with a horizontal scanning duration HS and a horizontal blanking duration HB. In addition, the generation of the clock CK1 from the clock generator 634 is corresponding to each enable pulse of the clock CKG1; the generation of the clock CK2 from the clock generator 644 is corresponding to each enable pulse of the clock CKG2; and the generation of the clock CK3 from the clock generator 654 is corresponding to each enable pulse of the clock CKG3. In addition, the output command STR is generated within each horizontal blanking duration HB.

In addition, it is understood that two transmission buses can be also disposed between the data driving circuits 630, 640 and the data driving circuits 640, 650, respectively. The operation of the two transmission buses is similar to that of the transmission bus 350 in the aforementioned embodiment, and no unnecessary detail is given here.

The Fourth Embodiment

Figure 8:
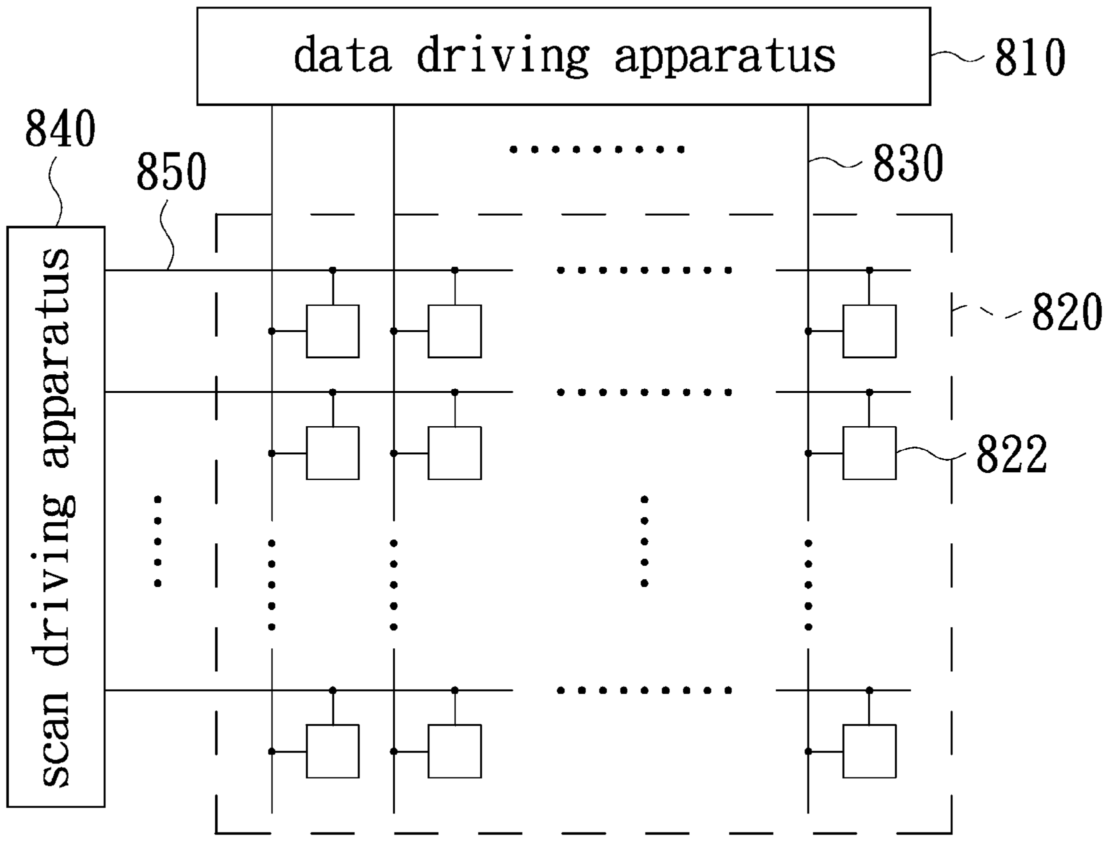
FIG. 8 is a schematic view of a display in accordance with another embodiment of the present disclosure.

FIG. 8 is a schematic view of a display in accordance with a fourth embodiment of the present disclosure. As shown, the display in this embodiment includes a data driving apparatus 810 disclosed in the aforementioned embodiments, a display panel 820, a plurality of data lines 830, a scan driving apparatus 840 and a plurality of scan lines 850. The data driving apparatus 810, exemplified by including two data driving circuits (not shown), is configured to output the processed first and second portions of the data. The display panel 820 includes a plurality of the pixels 822. The data lines 830, electrically connected to columns of pixel 822 respectively and the data driving apparatus 810, are configured to transmit the processed first and second portions of the data to the associated pixels 822. The scan driving apparatus 840 is configured to provide a scan signal; and the scan lines 850, electrically rows of pixel 822 respectively and the scan driving apparatus 840, are configured to transmit the scan signal to the associated pixels 822.

Figure 9:
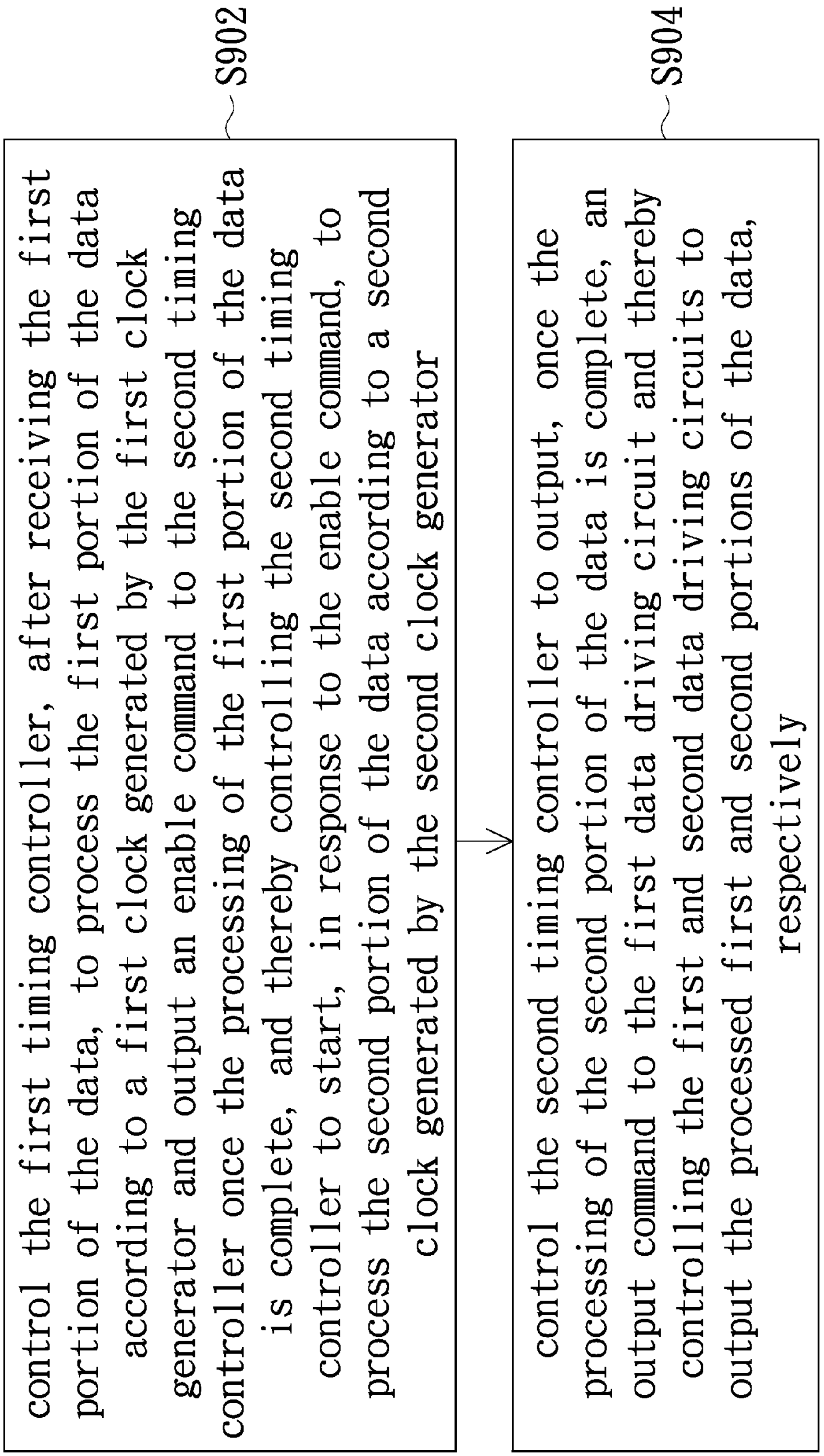
FIG. 9 is a flow chart illustrating an operation method of a data driving apparatus in accordance with another embodiment of the present disclosure.

Therefore, the operation of the data driving apparatus disclosed in the aforementioned embodiments can be summarized to some basic operation steps by those ordinarily skilled in the art as illustrated in FIG. 9, which is a flow chart illustrating an operation method of a data driving apparatus in accordance with an embodiment of the present disclosure. The data driving apparatus includes a first data driving circuit and a second data driving circuit; the first data driving circuit, including a first timing controller with a first clock generator, is configured to receive a first portion of data corresponding to a row of pixel in an image frame. The second data driving circuit, including a second timing controller with a second clock generator, is configured to receive a second portion of the data corresponding to the row of pixel in the image frame. The operation method includes steps of: controlling the first timing controller, after receiving the first portion of the data, to process the first portion of the data according to a first clock generated by the first clock generator and output an enable command to the second timing controller once the processing of the first portion of the data is complete, and thereby controlling the second timing controller to start, in response to the enable command, to process the second portion of the data according to a second clock generated by the second clock generator (step S902); and controlling the second timing controller to output, once the processing of the second portion of the data is complete, an output command to the first data driving circuit and thereby controlling the first and second data driving circuits to output the processed first and second portions of the data, respectively (step S904).

In addition, it is understood that the operation method of a data driving apparatus according to the present disclosure is also applicable to use to the data driving apparatus including more than two data driving circuits.

In summary, the data driving apparatus according to the present disclosure is configured to sequentially perform: controlling the first timing controller, after receiving the first portion of the data, to process the first portion of the data according to a first clock generated by the first clock generator; controlling the first timing controller to output an enable command to the second timing controller once the processing of the first portion of the data is complete; controlling the second timing controller to start, in response to the enable command, to process the second portion of the data according to a second clock generated by the second clock generator; and controlling the second timing controller to output, once the processing of the second portion of the data is complete, an output command to the first data driving circuit and thereby controlling the first and second data driving circuits to output the processed first and second portions of the data, respectively. Thus, the timing controllers of the data driving apparatus according to the present disclosure are able to output data synchronously while operating at respective individual clocks.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data driving apparatus, comprising:

a first data driving circuit configured to receive a first portion of data corresponding to a row of pixel in an image frame, wherein the first data driving circuit comprises a first timing controller and the first timing controller comprises a first clock generator; and a second data driving circuit configured to receive a second portion of the data corresponding to the row of pixel in the image frame, wherein the second data driving circuit comprises a second timing controller and the second timing controller comprises a second clock generator;

wherein the first timing controller is further configured to, after receiving the first portion of the data, process the first portion of the data according to a first clock generated by the first clock generator and output an enable command to the second timing controller in response to a finish of the processing of the first portion of the data, and the second timing controller is further configured to start, in response to the enable command, to process the second portion of the data according to a second clock generated by the second clock generator and output an output command to the first data driving circuit in response to a finish of the processing of the second portion of the data and thereby controlling the first and second data driving circuits to output a processed first and a processed second portions of the data, respectively.

2. The data driving apparatus according to claim 1, wherein the first and second timing controllers both have a color engine function, and the first and second timing controllers are further configured to perform the color engine function on the first and second portions of the data according to the first and second clocks, respectively.

3. The data driving apparatus according to claim 1, wherein the first data driving circuit is further configured to, while issuing the enable command to the second data driving circuit, simultaneously provide an index parameter to the second data driving circuit, the index parameter is used for indicating the total number of the pixels corresponding to the first portion of the data.

4. The data driving apparatus according to claim 3, further comprising:

a transmission bus electrically connected between the first and second data driving circuits and comprising:

a transmission control line configured to control a transmission direction or data type of signals on the transmission bus;

a clock transmission line configured to, according to the voltage level on the transmission control line, selectively transmit a third clock generated by the first data driving circuit or a fourth clock generated by the second data driving circuit to transmit;

a data transmission line configured to, according to the voltage level on the transmission control line, selectively transmit first data generated by the first data driving circuit or second data generated by the second data driving circuit, wherein the enable command and the index parameter both are included in the first data; and an enable command transmission line configured to transmit the output command.

5. The data driving apparatus according to claim 4, wherein the vertical scanning period of each image frame is defined with a vertical scanning duration and a vertical blanking duration, and the first and second timing controllers are further configured to perform a data exchange operation by using the first and second data within the vertical blanking duration.

6. The data driving apparatus according to claim 1, wherein the vertical scanning period of each image frame is defined with a vertical scanning duration and a vertical blanking duration, and the first and second timing controllers are further configured to perform a data exchange operation by using the first and second data within the vertical blanking duration.

7. The data driving apparatus according to claim 1, further comprising:

a transmission bus electrically connected between the first and second data driving circuits and comprising:

a transmission control line configured to control a transmission direction or data type of signals on the transmission bus;

a clock transmission line configured to, according to the voltage level on the transmission control line, selectively transmit a third clock generated by the first data driving circuit or a fourth clock generated by the second data driving circuit to transmit;

a data transmission line configured to, according to the voltage level on the transmission control line, selectively transmit first data generated by the first data driving circuit or second data generated by the second data driving circuit, wherein the enable command and the index parameter both are included in the first data; and an enable command transmission line configured to transmit the output command.

8. The data driving apparatus according to claim 7, wherein the third and fourth clocks each are referred to as a reference clock while the first and second timing controllers perform data transmissions, respectively; and the first and second clocks each are referred to as a reference clock while the first and second timing controllers perform computations, respectively.

9. The data driving apparatus according to claim 8, wherein the first and second clocks each are configured to have a frequency greater than the third and fourth clocks have.

10. The data driving apparatus according to claim 7, wherein the first and second clocks each are configured to have a frequency greater than the third and fourth clocks have.

11. The data driving apparatus according to claim 7, wherein the third clock is generated according to the first clock, and the four clock is according to the second clock.

12. A display, comprising:

a data driving apparatus as claimed in claim 1 configured to output the processed first and second portions of the data;

a display panel comprising a plurality of pixels;

a plurality of data lines, electrically connected to columns of the pixel respectively and the data driving apparatus, configured to transmit the processed first and second portions of the data to the associated pixels;

a scan driving apparatus configured to provide a scan signal; and a plurality of scan lines, electrically connected to rows of the pixel respectively and the scan driving apparatus, configured to transmit the scan signal to the associated pixels.

13. An operation method of a data driving apparatus, the data driving apparatus comprising a first data driving circuit and a second data driving circuit, the first data driving circuit, comprising a first timing controller with a first clock generator, being configured to receive a first portion of data corresponding to a row of pixel in an image frame, the second data driving circuit, comprising a second timing controller with a second clock generator, being configured to receive a second portion of the data corresponding to the row of pixel in the image frame, the operation method comprising:

controlling the first timing controller, after receiving the first portion of the data, to process the first portion of the data according to a first clock generated by the first clock generator and output an enable command to the second timing controller once the processing of the first portion of the data is complete, and thereby controlling the second timing controller to start, in response to the enable command, to process the second portion of the data according to a second clock generated by the second clock generator; and controlling the second timing controller to output, once the processing of the second portion of the data is complete, an output command to the first data driving circuit and thereby controlling the first and second data driving circuits to output the processed first and second portions of the data, respectively.

14. The operation method according to claim 13, wherein the first and second timing controllers both have a color engine function, and the operation method further comprises:

controlling the first and second timing controllers to perform the color engine function on the first and second portions of the data according to the first and second clocks, respectively.

15. A data driving apparatus, comprising:

a first data driving circuit configured to receive and process a first portion of data corresponding to a row of pixel in an image frame, wherein the first data driving circuit comprises a first timing controller and the first timing controller comprises a first clock generator;

a second data driving circuit configured to receive and process a second portion of the data corresponding to the row of pixel in the image frame, wherein the second data driving circuit comprises a second timing controller and the second timing controller comprises a second clock generator; and a transmission bus electrically connected between the first and second data driving circuits and comprising:

a transmission control line configured to control a transmission direction or a data type of signals on the transmission bus;

a clock transmission line configured to, according to the voltage level on the transmission control line, selectively transmit a clock generated by the first data driving circuit or a clock generated by the second data driving circuit;

a data transmission line configured to, according to the voltage level on the transmission control line, selectively transmit first data generated by the first data driving circuit or second data generated by the second data driving circuit; and an enable command transmission line configured to transmit and output command for controlling the first and second data driving circuits to output the processed first and second portions of the data, respectively.

16. The data driving apparatus according to claim 15, wherein the first data driving circuit further comprises a third clock generator configured to generate a third clock, the second data driving circuit further comprises a fourth clock generator configured to generate a fourth clock, and the clock transmission line is configured to transmit the first, second, third or fourth clocks.

17. The data driving apparatus according to claim 16, wherein the third and fourth clocks each are referred to as a reference clock while the first and second timing controllers perform data transmissions, respectively; and the first and second clocks each are referred to as a reference clock while the first and second timing controllers perform computations, respectively.

18. The data driving apparatus according to claim 17, wherein the first and second clocks each are configured to have a frequency greater than the third and fourth clocks have.

19. The data driving apparatus according to claim 16, wherein the first and second clocks each are configured to have a frequency greater than the third and fourth clocks have.

20. The data driving apparatus according to claim 16, wherein the third clock is generated according to the first clock, and the four clock is according to the second clock.

* * * * *